United States Patent [19]

Robertson et al.

[11] Patent Number: 5,593,122
[45] Date of Patent: Jan. 14, 1997

[54] HANGER/HOOK ACCESSORY

[76] Inventors: Tim E. Robertson, 6400 Cranston Pl., Saginaw, Mich. 48603; Tad W. Robertson, 5340 E. Jordan Rd., Mt. Pleasant, Mich. 48858

[21] Appl. No.: 319,111

[22] Filed: Oct. 6, 1994

[51] Int. Cl.⁶ .................................................. E04H 4/16
[52] U.S. Cl. .................. 248/222.12; 248/303; 248/304; 248/215; 248/205.1; 4/496; 4/500; 403/326
[58] Field of Search ............................. 248/221.4, 302, 248/303, 304, 156, 215, 79, 339, 73, 80, 87, 89, 121, 176.1, 205.1, 225.31, 227; 4/500, 496; 403/388, 389, 326, 327

[56] References Cited

U.S. PATENT DOCUMENTS

| | | | |
|---|---|---|---|
| 194,707 | 8/1877 | Merrill | 248/303 |
| 791,713 | 6/1905 | McCarthy | 248/156 X |
| 873,488 | 12/1907 | De Beaumont et al. | 248/227 |
| 1,366,872 | 1/1921 | Cantleberry | 248/156 X |
| 2,572,937 | 10/1951 | Lawson | 248/87 X |
| 2,651,804 | 9/1953 | Wilkin | 403/388 X |
| 2,764,383 | 9/1956 | Wood | 248/227 |
| 2,954,954 | 10/1960 | Larson | 248/215 |
| 2,956,762 | 10/1960 | Alston | 248/87 |
| 3,260,489 | 7/1966 | Hentzi | 248/215 |
| 3,285,554 | 11/1966 | Voelkerding | 248/156 X |
| 3,707,007 | 12/1972 | Trostler | 4/500 |
| 4,369,109 | 1/1983 | Edge | 4/496 X |
| 4,650,144 | 3/1987 | Conrad | 248/339 X |
| 5,068,928 | 12/1991 | Powell | 4/500 |
| 5,074,419 | 12/1991 | Smith | 248/215 X |
| 5,110,075 | 5/1992 | Reid et al. | 248/79 |
| 5,118,059 | 6/1992 | Mainer | 248/215 |
| 5,287,869 | 2/1994 | Wu | 403/327 X |
| 5,413,297 | 5/1995 | Adams | 248/215 |

*Primary Examiner*—Alvin C. Chin-Shue
*Assistant Examiner*—Brian J. Hamilla
*Attorney, Agent, or Firm*—Learman & McCulloch

[57] ABSTRACT

A hanger/hook accessory supports articles on a vertically dependent member hung from an outer underside of a pool rim member. The hanger/hook accessory has a mounting bracket attached to an outer underside of a pool rim member; a removable fastener device connecting the mounting bracket to a member having opposite ends; and a hook connected to the member for supporting the articles. In a second embodiment, a mounting bracket is attached to outer underside of the pool rim member, the bracket having a vertically extending dependent portion; a hook with a mounting connector portion at one end; and a removable fastener device securing the mounting connector portion of the hook to the dependent portion of the bracket.

7 Claims, 3 Drawing Sheets

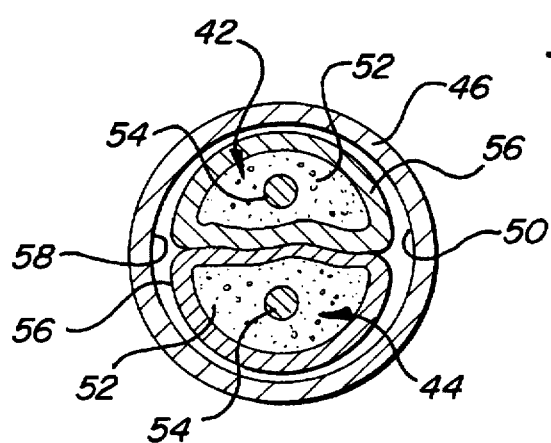
FIG-4A
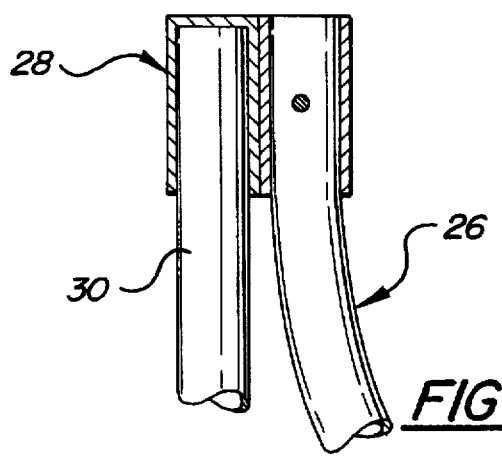
FIG-5
FIG-6
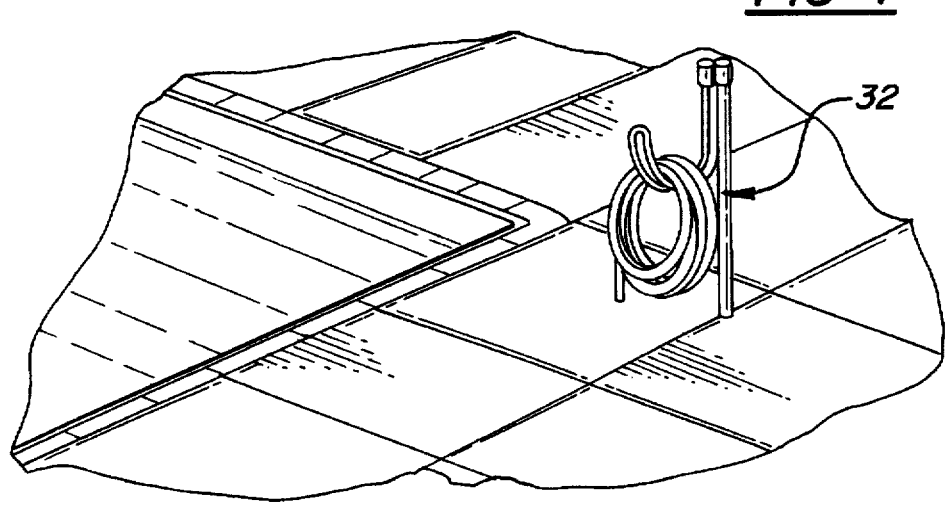
FIG-7

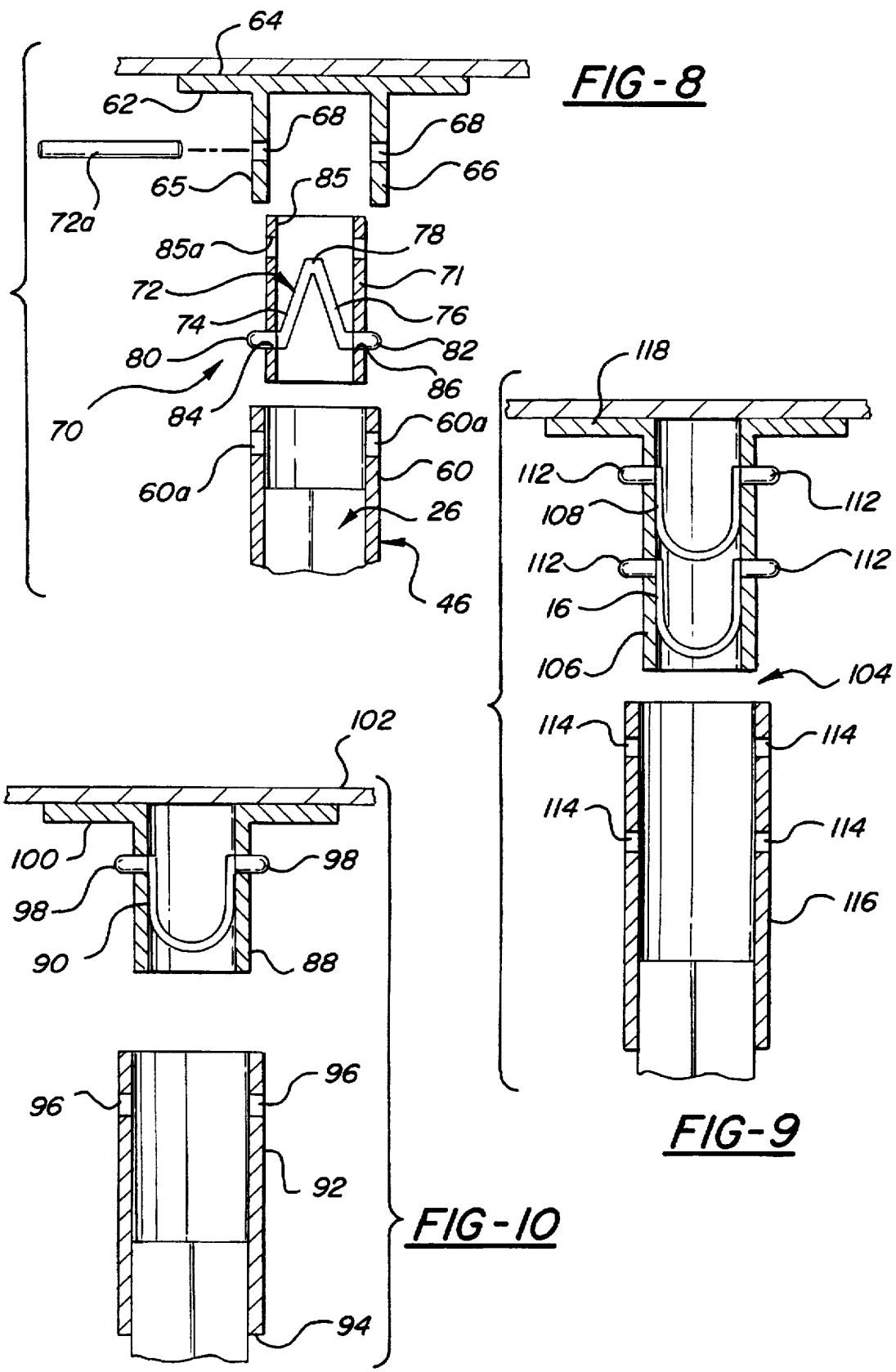

HANGER/HOOK ACCESSORY

BACKGROUND OF THE INVENTION

1. Field of the Invention

This invention relates to hanger and/or hook accessories for supporting articles from a support member and, more particularly, to such hanger and hook accessories for supporting articles laterally of a support member.

2. Description of the Related Art

Hangers are known for supporting articles laterally of support members, including pipe stanchions, cable hangers, and the like. Other examples of hangers, include hangers for curtains, flower pots and the like or hangers used in the automotive field such as those used to support exhaust pipes, electrical wiring harnesses, and other articles that have a substantial longitudinal extent.

Another type of hanger is shown in U.S. Pat. No. 5,068,928 which discloses a hook that is configured to store a rolled pool cover. In the '928 patent the hook includes an inner mounting portion that is bent upon itself for coupling the inner edge portion of the storage hook to the inside, annular flange on an annular cap supported on the upper terminal end of a side wall of an above-ground pool. Such an arrangement requires a special hook configuration that will match a particular annular cap design. Since the dimensions of such annular caps differ in accordance with the pool design, the hook approach shown in the '928 patent requires a wide inventory of parts to fit the various types of above-ground pools presently being manufactured.

BRIEF DESCRIPTION OF THE INVENTION

An object of the present invention is to provide a low cost, easily manufactured hanger/hook accessory that can be quickly connected to a variety of mounting arrangements so as to provide storage capacity on a mounting member.

A further object of the present invention is to provide such a hook accessory having a looped tubular member forming the storage capacity of the hanger/hook accessory.

A still further object of the present invention is to provide a hook accessory that can be mounted on the outer, underside of a top rail cap of an above-ground pool by use of a mounting member that will fit all pool types.

Yet another object of the present invention is to provide a hook accessory for supporting articles on a vertically dependent member hung from the outer underside of a top rail cap at a mounting bracket adapted to be connected to the outer underside of the pool rim member; the vertically dependent member having an open end thereon and a removable fastener device adapted to connect the dependent member to the mounting bracket and for disposing the dependent member to be vertically dependent from the outer underside of the pool rim member and wherein a looped member is provided having a pair of ends adapted to be connected in the open end of the vertically dependent member and including a looped end that is spaced from and joined to the pair of ends for forming a support surface located laterally of the dependent member.

Still another object is to provide the hook accessory of the preceding object wherein the looped member has a cradle configuration between the pair of ends and the looped end.

Another object is to provide the hook accessory of the preceding objects wherein the looped member is tubular and extends continuously between the pair of ends and the looped end.

Yet another object is to provide the hook accessory of the preceding objects wherein the looped member is continuously curved from the pair of ends to the looped end.

Still another object of the invention is to provide the hook accessory of the preceding objects wherein the dependent member has two open ends, one of the open ends receiving the pair of ends and the other end adapted to be connected to a mounting bracket by a releasable fastener.

Still further objects of the invention are to provide a hook accessory of the preceding object wherein the dependent member has two open ends, one of the open ends receiving the pair of ends; an intermediate mounting connector is provided having one end adapted to be connected to the mounting bracket by a releasable fastener and having an opposite end; a clip member removably supported within the opposite end and including end portions that are spring biased outwardly of the opposite end; and the other of the two open ends of the dependent member having openings therein that releasably receive the end portions for securing the looped member in place on the mounting bracket.

A still further object of the invention is to provide a hook accessory for supporting articles comprising a looped member; the looped member including a bight portion and a pair of free ends spaced with respect to the bight portion; the looped member being curved between the bight portion and the pair of free ends for forming a cradle support.

Another object of the invention is to provide a hook accessory further comprising a mounting connector having a first end joined to the pair of free ends and including a second end adapted to be joined to a mounting member.

Another object of the invention is to provide a hook accessory further comprising a mounting connector having a first end joined to the pair of free ends and including a second end having a clip member thereon with fastener ends biased outwardly of the second end adapted to be joined to a mounting member.

Another object of the invention is to provide a hook accessory further comprising a mounting connector having a first end joined to the pair of free ends and including a second end having openings therein adapted to receive mechanical fasteners for joining the mounting connector to a mounting member.

Another object of the invention is to provide a hook accessory of the preceding object further comprising a looped member that is a tubular member that is continuously curved from the pair of ends to the bight portion.

These and other objects, advantages and features of the present invention will become more apparent from the following detailed description when taken together with the accompanying drawings wherein:

BRIEF DESCRIPTION OF THE DRAWINGS

FIG. 4a is an enlarged cross-sectional view taken along the line 4a—4a in FIG. 2 looking in the direction of the arrows;

FIG. 5 is a fragmentary perspective view of a post mounted version of the hook accessory of the present invention;

FIG. 6 is a fragmentary sectional view of another embodiment of a post mounted version of the hook accessory of the present invention;

FIG. 7 is a fragmentary sectional view of a hanger for use with the present invention;

FIG. 8 is a fragmentary sectional view of another embodiment of a hanger for use with the present invention;

FIG. 9 is a fragmentary sectional view of still another embodiment of a hanger for use with the present invention; and FIG. 10 is a fragmentary sectional view of yet another embodiment of the present invention.

DETAILED DESCRIPTION OF THE PREFERRED EMBODIMENT

Figure 1:
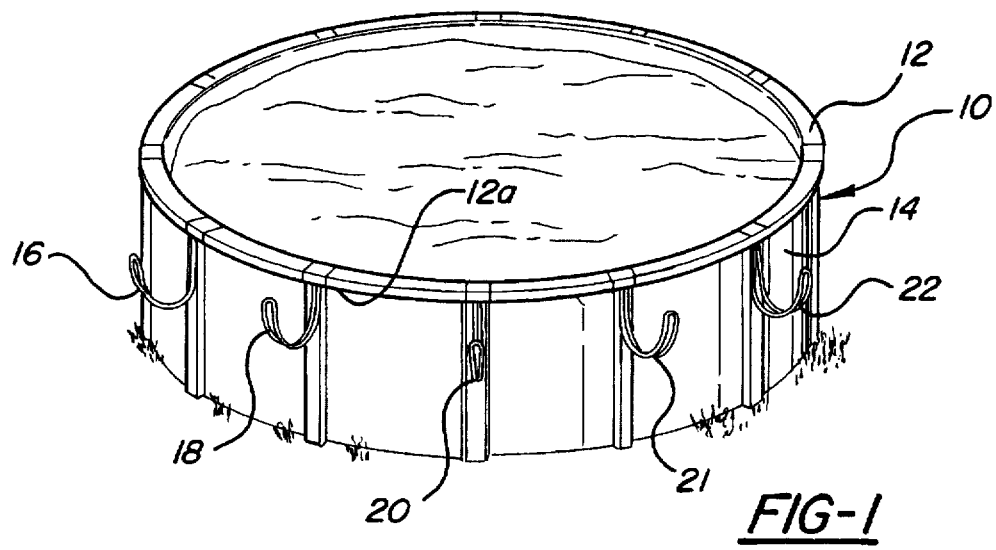
FIG. 1 is a perspective view of a pool storage system including the hook accessory of the present invention.

FIG. 1 shows an above-ground pool 10 having a top rail cap 12 supported on the upper edge of the side wall 14 of the pool. A plurality of hanger/hook assemblies 16, 18, 20, 21 and 22 are located on one side of the pool to define an arcuate cradle generally having the shape outlined at 24. The arcuate cradle is made up of the width of a hook accessory 26, best shown in FIGS. 2–4 that is part of each of the assemblies 16, 18, 20, 21 and 22.

FIG. 5 shows the hook accessory 26 of the present invention supported by a cap member 28 on the top of a free standing post or support rod 30 located adjacent the side wall of an above-ground pool.

FIG. 7 shows the hook accessory of the present invention supported on a support post 32 forming a pool accessory center adjacent a below-ground pool. As shown in FIGS. 5 and 6, each of the hook accessories of the present invention can be used as a support cradle for a wide variety of articles such as float rings, water toys, hoses, clothing or the like.

In accordance with one aspect of the invention, each of the hook accessories 26 are adapted to be received on top rail caps having different dimensions. Thus, the hook accessories 26 are universally adaptable to a wide range of above-pool designs without having to modify connections between the hook accessories 26 and a top rail cap such as the top rail cap 12 shown in FIG. 1.

Thus, each of the hook accessories 26 include a mounting bracket generally shown in FIG. 1 as being connected by suitable releasable fastener assemblies, such as screws, bolts, rivets, or snap fasteners or by adhesives to the outer underside surface 12a of the top rail cap 12. Accordingly, the upper surface of the to rail cap is free of hooks or other cantilever devices such as shown in U.S. Pat. No. 5,068,928. Specific examples of suitable brackets are shown in the embodiments of FIGS. 8–10 with it being shown therein that the bracket can include a flat portion thereon connected to the underside of the pool rim and a vertically hanging portion that connects to a hook member for carrying the pool cover.

Each mounting bracket has a hanger assembly secured thereto that in turn is connected to the hook accessory 26 of the present invention.

Figure 4:
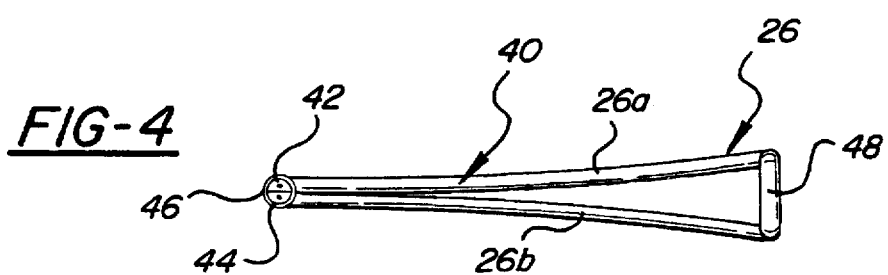
FIG. 4 is a top elevational view of the hook accessory shown in FIG. 2.

As shown in FIGS. 4 and 4a, each hook accessory 26 includes a looped member 40 with a pair of ends 42, 44 joined to a mounting connector 46. The looped member 40 includes a looped end 48 laterally spaced from the pair of ends 42, 44. In a preferred embodiment, the looped member 40 is tubular and is convexly curved between the looped end 48 and the pair of ends 42, 44 for forming the cradle 24 between the adjacent plurality of hanger/hook assemblies 16, 18, 20, 21 and 22 and for forming a saddle-like seat 50 on the hooks 26 thereof.

In one working embodiment, the looped member 40 is a coaxial cable tubular member having plastic insulating material 52 surrounding internal wire 54 and clad by outer aluminum tubing 56. In this embodiment, as best seen in FIG. 4a, the pair of ends 42, 44 are deformed from a round shape, as shown in FIG. 4a, to a semi-round shape such that they can be received in pressed engagement within the open end 58 of the mounting connector 46.

Figure 2:
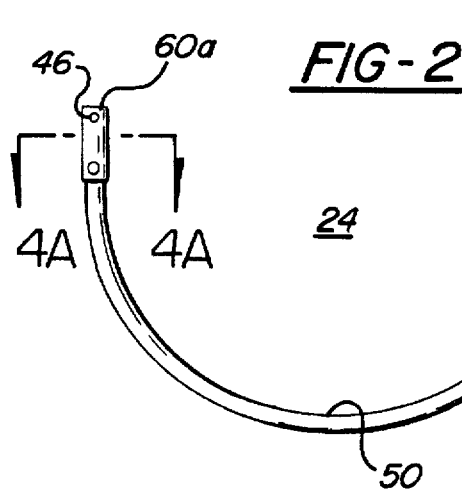
FIG. 2 is an enlarged side elevational view of the hook accessory of the present invention.

As shown in FIG. 2, the upper end 60 of the mounting connector 46 has side apertures 60a for connection to suitable fasteners of the hanger assembly, as will be described in greater detail in the following text.

In one working embodiment, each of the hook accessories 26 has spaced legs 26a, 26b that diverge from the pair of ends 42, 44 and that are connected to the looped end 48. In one working embodiment, the looped end 48 has a width between 4 to 8 inches and the looped member 40 has a total length from end 42 to end 44 of 3'-6".

The tube diameter is ½ inch. These dimensions are suitable for pool cover support and for holding a wide variety of pool accessories. They can be varied in accordance with a particular application. However, dimensions of from ¼ inch to ¾ inch tube diameter and 2 feet to 6 feet overall length of the tubular member are believed to encompass most useful applications that will support pool accessories without imposing excessive moments on a mounting member.

Figure 3:
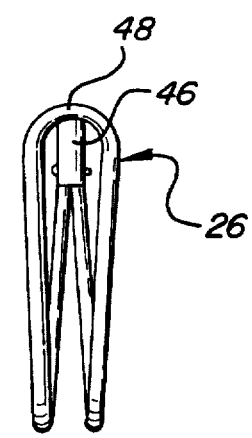
FIG. 3 is a front elevational view of the hook accessory shown in FIG. 2.

In the illustrated arrangement, hook accessory 26 is formed by shaping about a 24 inch diameter form such that the curvature of the embodiment shown in FIGS. 2–4 is on a radius of approximately 12 inches. It will be understood by those skilled in the art that the overall dimensions will vary depending upon the application to which the hook accessory is put, but the aforesaid dimensions have been found suitable for use in the above-illustrated cover support application, as shown in FIG. 1.

Referring now to the embodiment of FIG. 8, a combination mounting bracket 62 is connected to the underside of a support member 64. The mounting bracket 62 has spaced dependent legs 65, 66 each having a connection hole 68 therein. A hanger assembly 70 for a hook accessory 26 comprises a vertically dependent tubular member 71 that has a butterfly fastener 72 supported therein. The butterfly fastener 72 includes a pair of legs 74, 76 connected at juncture 78 and biased apart for holding rounded ends 80, 82 outwardly in openings 84, 86 in one end of the tubular member 71. The rounded ends 80, 82 pilot the tubular member 71 and are biased inwardly when the tubular member 71 is connected in the upper open end 60 of vertically dependent mounting connector 46. When the rounded ends 80, 82 are aligned with the connection holes 60a they will snap outwardly into interlocking relationship such that the hanger assembly 70 holds the hook accessory 26 vertically below the underside of the support member 64, in the case of an above-ground pool, this point is the underside of the outer edge of the top rail cap. In the embodiment of FIG. 7, the tubular member 71 has an open end 85 with openings 85a that align with holes 68 to receive suitable fasteners, for example, a pin 72a, to complete the hanger assembly 70 such that the remainder of the hook accessory 26 is located laterally of the support member 66 for forming a support to one side thereof such that pool covers, pool accessories, toys, clothing or other articles can be supported thereon.

In the embodiment of FIG. 10, a hanger assembly 87 has an intermediate tubular member 88 and a butterfly clip fastener 90. In this case, the butterfly clip fastener 90 has U-bend legs and is inverted from the position shown in FIG. 8 and a mounting connector portion 92 is fastened to the pair of ends of the hook accessory 26 at a lower open end of the mounting connector 94 and houses the clip fastener 90. An upper open end of the mounting connector 92 has openings 96 therein that receive rounded ends 98 on the butterfly clip fastener 90 for connecting the hook accessory 26 in the hanger assembly 87. The upper end of the intermediate tubular member 88 is integral with a bracket 100 connected to a support member 102.

In the embodiment of FIG. 9, a hanger assembly 104 is shown that has an intermediate tubular mounting member 106 with two butterfly clips 108, 110 therein. The butterfly clips 108, 110 have rounded ends 112 releasably engageable with two pairs of spaced holes 114 in the upper end of a mounting connector 116 that connects to the pair of ends of a hook accessory 26. This embodiment of the invention provides a double release force such that hooks associated therewith will have a greater load bearing capacity. In this embodiment the upper end of the intermediate tubular mounting member 106 is integral with a mounting bracket 118 corresponding to the mounting bracket in the FIG. 10 embodiment.

While the hanger assemblies are shown as members shaped as hollow cylinders it will be understood that they can be fabricated from rectangular, square, octagonal, triangular or other geometrically shaped hollow stock. Also, while combination brackets are shown it should be understood that they can be replaced by L-brackets or U-brackets.

While the aforesaid embodiments of the invention are shown for use in pool related applications, it will be understood that the hanger and hook accessory of the present invention is suitable for supporting a wide variety of articles requiring a substantial lateral extent with spaced members that define a saddle configuration of variable width from one end to the opposite end so that a variety of objects can be hung therefrom or supported thereabove.

Although the present invention has been described with reference to preferred embodiments, workers skilled in the art will recognize that changes may be made in form and detail without departing from the spirit and scope of the invention.

What is claimed is:

1. A hanger accessory for supporting articles on a vertically dependent member hung from an outer underside of a pool rim member comprising:

a mounting bracket adapted to be connected to the outer underside of the pool rim member, said mounting bracket supporting a generally vertically extending dependent portion adapted to extend from the underside of the pool rim member;

a hook having a mounting connector portion at one end thereof connectable with said dependent portion;

a removable fastener device securing said mounting connector portion of said hook releasably to said dependent portion of said bracket for disposing said hook to be vertically dependent from the outer underside of the pool rim member;

said hook including a spaced end for forming a support surface located laterally of said bracket at a point below said pool rim.

2. A hanger accessory for supporting articles on a vertically dependent member hung from an outer underside of a pool rim member comprising:

a mounting bracket adapted to be connected to the outer underside of the pool rim member;

a member having opposite ends thereon;

a removable fastener device adapted to connect said member to the mounting bracket and for disposing said member to be vertically dependent from the outer underside of the pool rim member;

a hook adapted to be connected to said member and including a spaced end for forming a support surface located laterally of said member.

3. The hanger accessory of claim 1 wherein said hook includes a cradle portion adjacent said spaced end.

4. The hanger accessory of claim 1 wherein said hook includes a tubular member extending continuously between said member and said spaced end.

5. The hanger accessory of claim 1 wherein said hook is continuously curved from said member to said spaced end.

6. The hanger accessory of claim 1 wherein said hook has a pair of ends and said member has two open ends, one of said open ends receiving said pair of ends; an intermediate connector having one end adapted to be connected to said mounting bracket by removable fastener elements.

7. The hanger accessory of claim 5 including a clip member removably supported within an opposite end of said intermediate connector element and including end portions that are spring biased outwardly of said opposite end; and the other of said two open ends of said member having openings therein that releasably receive said end portions for securing said holder in place on said mounting bracket.

* * * * *

UNITED STATES PATENT AND TRADEMARK OFFICE
CERTIFICATE OF CORRECTION

PATENT NO. : 5,593,122
DATED : January 14, 1997
INVENTOR(S) : Tim E. Robertson et al It is certified that error appears in the above-indentified patent and that said Letters Patent is hereby corrected as shown below:

Col. 6, Claim 1, line 6, change "supporting" to -- having --.

Signed and Sealed this

First Day of April, 1997

*Attest:*

BRUCE LEHMAN

*Attesting Officer*  Commissioner of Patents and Trademarks